Nov. 20, 1923.
C. O. WALPER
1,474,657
PLASTER BOARD
Filed Aug. 14, 1922
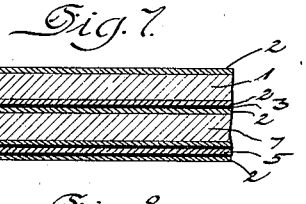
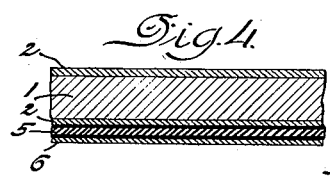
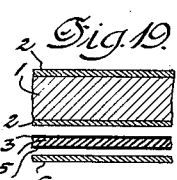
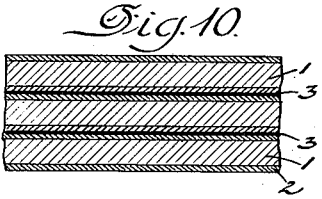
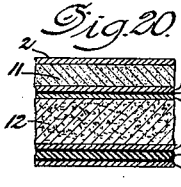
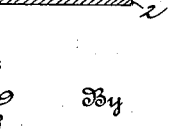
Inventor:
Curry Ora Walper
By
Barthel & Barthel
Attorneys Patented Nov. 20, 1923.

1,474,657

UNITED STATES PATENT OFFICE.

CURRY ORA WALPER, OF DETROIT, MICHIGAN, ASSIGNOR OF ONE-THIRD TO FRANK A. MASLEN AND ONE-THIRD TO BERNARD E. CLARK, BOTH OF DETROIT, MICHIGAN.

PLASTER BOARD.

Application filed August 14, 1922. Serial No. 581,648.

*To all whom it may concern:*

Be it known that I, CURRY ORA WALPER, a citizen of the United States of America, residing at Detroit, in the county of Wayne and State of Michigan, have invented certain new and useful Improvements in Plaster Boards, of which the following is a specification, reference being had therein to the accompanying drawings.

This invention relates to plaster boards adapted for the reception of a finishing coat of plastic material.

It has for its principal object to provide boards of this character with a waterproof layer or layers of material adapted to control or prevent the passage of moisture through the board.

In order that a plastic composition may adhere well to a paper surface, it is necessary that the paper shall be capable of absorbing some moisture from the composition. If a layer of paper capable of receiving moisture is applied directly to the surface of a plastic composition which is also capable of absorbing moisture, there is nothing to prevent moisture in a wet finishing coat placed upon the paper surface from being absorbed by the body of the board and, where the finishing coat is very wet or where work is done in damp weather, the absorption of moisture may proceed to an extent such that the boards wil become distorted or warped. Upon drying cracks may be formed in the surface coating or there may be such unevenness in the rate of drying of the different portions that the wall will be permanently distorted.

In the present invention, the boards will be made of one or more layers of plastic composition and a paper layer or layers sufficiently absorbent to adhere firmly to the face or faces of the plastic composition layer or layers adjacent thereto, each board having one or more layers of material impervious to water forming a cement to unite two layers of paper. The boards will thus have an absorbent surface adapted to receive a finishing coat of wet plastic material, but there will be a waterproof layer to limit the amount of absorption of moisture and thus to prevent the warping of the boards during the operation of applying the finishing coating, or subsequent drying of the board and coating.

Other and further objects will appear as the description proceeds, reference being had to the drawings forming a part of the specification, in which—

Figure 1 represents a section of an ordinary plaster board in which there is a central layer of plastic material having upon each face an absorbent paper coating;

Fig. 2 is a section of a similar board having an extra layer of porous paper cemented upon one of the layers of paper adhering to the plastic composition by means of a waterproof material;

Fig. 3 is a section of a modified form in which an extra layer of porous paper has been cemented to both of the paper surfaces of the board shown in Fig. 1;

Fig. 4 is a section of a board constituting an inversion of the form shown in Fig. 2, the waterproof layer being modified and applied to the rear surface of the original paper covering of the plaster board instead of to the front surface as in Fig. 2;

Fig. 5 is a section of plaster board in which there are two layers of plastic composition each having a porous paper coating adhering to both surfaces, the two adjacent paper coatings being cemented together by a central layer of impervious material;

Fig. 6 is a section of a board similar to that shown in Fig. 3 in which the single central layer of plastic material has been replaced by two layers of plastic material having between them a porous sheet of paper;

Fig. 7 is a section of a board having two layers of plastic material each having both its surfaces adhering to a layer of porous paper, the two adjacent surfaces of paper being united by an impervious material and the board having two additional sheets of paper cemented to one of its outer paper surfaces by means of two layers of impervious material, the outer paper being absorbent;

Fig. 8 is a board having three layers of plastic material each having both surfaces adhering to a layer of porous paper, the board having an extra sheet of paper secured to one of its outer faces by means of a waterproof material;

Fig. 9 is a section of a three-ply board similar to Fig. 8 except that the waterproof material unites two layers of porous paper within the interior of the board instead of upon its surface;

Fig. 10 is a section of a board similar to Fig. 9 in which a waterproof layer is interposed between each of the plastic layers and the layer adjacent thereto;

Fig. 11 is a section of a three-ply board similar to Fig. 10 but having an additional layer of porous paper cemented to one of the outer surfaces of the board;

Fig. 12 is a section of a three-ply board having a waterproof layer between two of the layers of plastic material and a second waterproof layer cementing a surface coating of absorbent paper upon the outer surface of the board most remote from the first layer of waterproof material;

Fig. 13 is a section of a reinforced fireproof board of a form similar to that shown in my co-pending application, Serial No. 493,921, filed August 20, 1921, but modified by the application to the outer surface thereof of two layers of porous paper united by a sheet of waterproof material;

Fig. 14 is a diagrammatic illustration in section of three plies of paper, the two outer layers being absorbent and the intermediate layer consisting of a sheet of paper, felt, or other absorbent material or fabric impregnated with a waterproof material and having adhesive material applied to both surfaces to receive the outer layers of absorbent paper;

Fig. 15 is a similar elevation showing the three layers of Fig. 14 united;

Fig. 16 is a diagrammatic illustration in section of one method of preparing the board shown in Fig. 2;

Fig. 17 is a diagrammatic illustration in section showing two absorbent sheets of paper, one being provided with a coating of waterproof cement to receive the other layer of paper;

Fig. 18 is a similar view showing the two layers of Fig. 17 united;

Fig. 19 is a diagrammatic view in section showing one method of preparing the board illustrated in Fig. 4;

Fig. 20 is a section showing a modification of the board shown in Fig. 7;

Fig. 21 is a diagrammatic illustration in section of a modified method of constructing a three-ply insulating paper surface similar to that shown in Fig. 15, and Fig. 22 is a view similar to Fig. 21 showing the three layers secured together.

The plastic material forming the body 1 of the ordinary wall board illustrated in Fig. 1 is usually a mixture of some form of prepared gypsum capable of taking up moisture to form a hydrated plastic compound mixed with sawdust, sand, or other chemically inert filler. Upon each surface of the body 1 is an adhering layer 2 of paper. If the paper 2 is given a size or coating to prevent the absorption of moisture, a plastic finishing coat will not have sufficient adhesion to withstand the strains to which it will frequently be subjected. Some compositions of material used as finishing coatings require considerable moisture during the period in which they receive their final set and unless the surface to which they are applied is absorbent enough to take up this moisture from the wet coating as it is applied satisfactory results will not be obtained. Other compositions require very much less moisture but still require that the surface to which they are applied shall be somewhat absorbent of moisture in order that they shall have the proper amount of adhesion.

In Fig. 2, the board is shown as having a body 1 of any suitable plastic composition to both surfaces of which adheres a layer 2 of absorbent paper. To the outer surface, a coating of an adhesive 3 is applied as indicated in Fig. 16 and an additional sheet of paper 4 is placed upon the adhesive 3. The adhesive 3 may consist of shellac, rosin, asphalt or other material impervious to moisture, the material being dissolved in any suitable solvent for ease of application or the material may be applied when melted, the essential condition being that the impervious material shall be capable of adhering to the layer of paper 2 and also to the layer of paper 4.

With a board prepared as described, when a finishing coat is applied to the paper surface 4, only as much water will be absorbed from the wet plastic material as can be taken up by the paper 4, the layer of adhesive 3 being substantially waterproof. If however the finishing coating is applied to the exposed surface layer 2, moisture may be absorbed from the coating by the outer layer 2 the plastic layer 1 and the paper layer 2 adjacent the waterproof layer 3. However the layer 4 will remain dry thus acting as a tension member to hold the board in position so that when the surface coating dries undue warping of the board will be prevented.

In the majority of cases where only a thin finishing coat is applied to the surface of the board sufficient moisture will be absorbed by a single paper layer and the form of board shown in Fig. 3 will then be preferred. In this embodiment of the invention, there is a single central layer of plastic composition 1 having on each face two sheets of porous paper 2 and 4 united by a waterproof material 3. As indicated in Fig. 17, the layer of waterproof cement 3 may be applied to the sheet 2 and the paper layer 4 may then be brought into contact with the adhesive cement 3 as indicated in Fig. 18 to form a two-ply layer of paper, both outer faces being absorbent but the intermediate cement being impervious to water. Sheets so prepared may be applied to the upper and lower surfaces of the wet plastic material forming the body 1 during the process of manufacture but obviously the same result may be obtained by coating both outer faces of the ordinary plaster board shown in Fig. 1 and applying a layer of paper 4 upon the adhesive coating, this being a mere duplication of the method indicated in Fig. 16.

Where plaster board is to be used on a wall which is likely to be damp, as for example a basement wall, additional waterproofing of the surface of the wall board which is to be placed next to the wall may be obtained by the use of a layer of felt, porous paper or other absorbent material or fabric 5 as indicated in Fig. 4. Upon the ordinary wall board of Fig. 1 having the central layer 1 and surface layers 2 is placed a sheet 5 of impregnated material having both surfaces coated with waterproof cement 3 and a protective sheet of paper 6 which may or may not be absorbent is laid upon the outer face of the sheet 5 as a means of preventing injury to the waterproof material 5 during the shipment or handling of the board.

A modified form of board is indicated in Fig. 5 in which there is a central layer of waterproofing material 3 uniting two sheets of porous paper 2 which adhere to layers of plastic composition 1 having outer layers of paper 2 adhering to their exposed surfaces. A board of this type may be used where a considerable amount of absorption is desired, the intermediate layer 3 acting to prevent the passage of moisture beyond a central plane so that even if the material exposed to the wet finishing coating should absorb a considerable amount of water, the dry layers of paper and plastic material back of the central waterproof layer would act to keep the board rigid. It is obvious that the construction shown in Fig. 3 may be applied to a plaster board having more than a single layer of plastic material. In Fig. 6 a modification is shown in which, instead of the single plastic composition layer of Fig. 3 there are two such layers united by a central sheet of paper 2, to which both layers adhere. A similar structure could of course have its central portion made up of three or more layers if desired.

In Fig. 7 a form of board is shown in which the surface intended to receive the finishing coat has a layer of absorbent paper 2 adhering to a plastic composition layer 1 which in turn adheres to a two-ply layer of paper of the form shown in Fig. 18 having the intermediate waterproof layer of cement 3. A second layer of plastic composition 7 which may or may not be of the same material as the first composition layer adheres to the absorbent paper layer 2 remote from the layer 1 and to the outer face of this composition layer 7 adheres a three-ply layer of paper and water-proof material which may be prepared as indicated in Fig. 14. The central layer 5 of this three-ply layer will be of felt, porous paper, asbestos, or other absorbent material or fabric and impregnated with a waterproofing material, the outer surface having applied thereto coatings of adhesive preferably waterproof to which are secured layers of absorbent paper 2, the three layers being placed together as indicated in Fig. 15 to form a three-ply surface coating highly resistant to moisture. It will be noted however that while the central layer 5 is waterproof the outer layers 2 on both faces are absorbent so that the plastic composition will adhere thereto. A board of this construction may be used with either face placed outward to receive the plastic finishing coating, the upper surface in Fig. 7 being used to receive the finishing composition where considerable absorption is desired while the opposite face is used to receive a finishing coating where only a slight absorption of moisture is necessary. The board shown in Fig. 8 is similar to that shown in Fig. 2, except that instead of a single plastic layer 1 being used there are a plurality of layers, three being shown in the figure, though, obviously 2, 4 or other desired number could be used. A board of this construction could be made by applying the waterproofing layer 3 and an outer absorbent paper layer 4 to the ordinary multi-ply plastic composition board now in common use, in a manner similar to that illustrated in Fig. 16 or the upper layers 2, 3 and 4 may first be prepared as illustrated in Figs. 17 and 18 and then applied to one of the outer surfaces of the board during the process of manufacture.

In Fig. 9 a waterproofing layer 3 is placed between two plastic layers of a board consisting of three or more layers whereby a board is produced having a greater quantity of absorbent material upon one side of the waterproofing layer than there is upon the other. Such a board may be used with either surface inward depending upon the amount of absorption desired.

In Fig. 10 a board is illustrated in which there are a plurality of layers of plastic composition with a layer of waterproofing material 3 lying between each outer layer of plastic material and the interior layer or layers. A board of this kind is evidently reversible either surface being capable of use for receiving a plastic finishing coating while at the same time there are two layers of waterproofing material to prevent passage of moisture from either side. By this means the central layer or layers of plastic material will remain dry even though such a board is applied to a damp wall and thereafter has a wet plastic surface finishing coating applied to the face remote from the wall.

In Fig. 11 a board is shown with a plurality of layers of plastic composition and a plurality of layers of waterproof composition, there being a layer of waterproof material between each plastic layer and the adjacent plastic layer, though in every case there is an absorbent layer of paper immediately adjacent to the plastic material. The board shown in Fig. 11 is obviously capable of use with either face inward to receive the plastic finishing coating, there being a difference of absorption in the two faces because of the fact that one face has a layer of waterproofing material directly beneath the outer layer of absorbent paper whereas the other face has a layer of plastic material adhering to the outer layer of absorbent paper.

Fig. 12 shows a modification of a structure shown in Fig. 11 in which an intermediate layer of waterproof material is omitted, only two layers of waterproofing being used, the one lying beneath the surface layer of paper forming one face of the board and the other lying beneath the outer layer of plastic material having a layer of absorbent paper on both faces. A board of this kind has the same function as that shown in Fig. 11, with the mere omission of an interior layer of waterproofing.

In Fig. 13 there is illustrated a fireproof reinforced composition board of a form similar to that shown in my copending application, Serial No. 493,921, filed August 20, 1921, having adhering to its outer surface remote from the metallic reinforcment a layer of absorbent paper 2 to which is cemented a surface layer of absorbent paper 4 by means of a waterproof composition 3 such as is used with any of the other forms of boards herein described. The metallic reinforcement 8 consists of an open mesh wire fabric and the nailing strips 9 are of flat sheet metal, the reinforcing fabric and the nailing strips being embedded in a layer of fireproof plastic composition 10 as described in the application above referred to. The wall board shown in Fig. 20 is intended for use in rooms where it is desired that the wall shall be nonresilient, as in auditoriums, halls and other rooms in which a highly resilient surface will result in undesirable acoustic properties. This board will have an outer absorbent surface layer of paper 2 upon a plastic layer 11 consisting of a composition of gypsum plaster containing crushed asbestic and having a layer of absorbent paper 2 upon its inner surface. This inner layer 2 will be cemented to another layer of absorbent paper 2 by means of a waterproof composition 3. Adhering to this third layer 2 will be a layer of plastic composition 12 which will preferably be considerably thicker than the layer 11 and for the sake of lightness will consist of a plastic mixture of gypsum and crushed scoria. To the outer surface of the layer 12 will be applied a three-ply waterproofing coating similar to that shown in Fig. 15 consisting of two layers of absorbent paper 2 having secured between them an intermediate layer 5 impregnated with a waterproofing composition.

Instead of first impregnating a fabric 5 with a water-proofing composition and then after it has dried or become hard attaching the surface layers of paper thereto by means of cement layers 3, the sheet 5 may be immersed in the waterproof composition having adhesive properties and immediately after it has issued from the bath, layers of absorbent paper 2, 2 may be placed on opposite surfaces as indicated in Fig. 21 and pressed closely in contact with the central layer to adhere thereto as indicated in Fig. 22, thus obviating the necessity of using additional coatings of waterproof cement.

It will, of course, be evident that the adhesive coatings 3 described may be applied to either or both of two confronting surfaces, and where a three-ply layer is to be made as in Figs. 14 and 21, the adhesive may be applied by passing the central sheet through a bath to coat both surfaces for the purpose of adhesion even though the material is not impregnated.

The term "paper" is intended to cover any coherent, fibrous, porous material capable of adhering to the wet plastic composition used for the body of the plaster board or to that used for the surface finishing coating.

Such paper sheets, either two-ply as in Fig. 18 or three-ply as in Figs. 15 and 21, may be applied to wet plastic material during the manufacture of the board, or they may be secured by an adhesive coating to the surface of any plaster board already formed.

It will also be obvious that a sheet having adhesive surfaces and impregnated with waterproof material may be substituted for the simple adhesive layer 3 wherever a heavier layer of impervious material is desired.

It will be obvious that many other modifications and changes in form and proportion may be made without departing from the principles of my invention or sacrificing any of its advantages. The invention therefore is claimed broadly within the valid and legitimate scope of the appended claims.

I claim:

1. A plaster board comprising a body of plastic material having a layer of absorbent paper adhering to one surface thereof, and a second layer of absorbent paper secured to the first mentioned layer of paper by means of a layer of material substantially impervious to water.

2. A plaster board comprising a layer of plastic material, a layer of paper forming a covering sheet for one surface of the plastic layer and adapted to adhere to the plastic material, a layer of material substantially impervious to water adhering to the surface of the paper remote from the plastic material and a second layer of porous paper adhering to the face of the impervious material remote from the plastic layer.

3. A plaster board comprising a plurality of layers, one or more of said layers consisting of plastic material and one or more of said layers consisting of absorbent paper adhering to a surface of a plastic layer, and a layer of material substantially impervious to water lying between and adhering to two layers of paper.

4. A plaster board comprising a plurality of layers, one or more of said layers consisting of a plastic composition, each plastic composition layer having adhering to both surfaces thereof a layer of porous paper, and a layer of material substantially impervious to moisture lying between and adhering to two layers of paper.

5. A structure as in claim 4 in which one of the outer surfaces consists of porous paper.

6. A structure as in claim 4 in which both of the outer surfaces consist of porous paper.

7. A plaster board having an outer surface layer consisting of porous paper, said board having a layer of plastic material and a layer of material substantially impervious to water, said layer of impervious material having a layer of porous paper adhering to both its surfaces.

8. A plaster board comprising a plurality of layers of plastic material, and a layer of material substantially impervious to water lying between and adhering to two layers of paper, said layers of paper and impervious material lying between two of the layers of plastic material.

9. A board as in claim 8, in which a plastic layer on one side of the impervious layer differs in character from a plastic layer on the other side of the impervious layer.

10. A plaster board comprising a plurality of layers of plastic material each having a layer of porous fibrous material adhering to both of its surfaces, and a layer of material substantially impervious to water lying between and adhering to two layers of porous fibrous material, said layer of impervious material lying between two layers of plastic material, two of the plastic layers differing in composition from each other.

11. A plaster board comprising a plurality of layers of plastic material, two of said layers differing in composition from each other.

12. A plaster board comprising a layer of plastic material consisting of asbestic and gypsum and a second layer of plastic material consisting of scoria and gypsum.

13. A board as in claim 12 having a layer of material impervious to water lying between the two layers of plastic material.

14. A plaster board comprising a layer of a plastic composition containing crushed asbestic, said layer having porous paper on both faces, a second layer of a plastic composition containing scoria, said second layer having porous paper on both faces, and a layer of material substantially impervious to water lying between the two layers of plastic material and assisting in securing them together.

In testimony whereof I affix my signature in presence of two witnesses.

CURRY ORA WALPER.

Witneses:
 ARTHUR MINNICK,
 LEWIS E. FLANDERS.